Patented Oct. 16, 1945

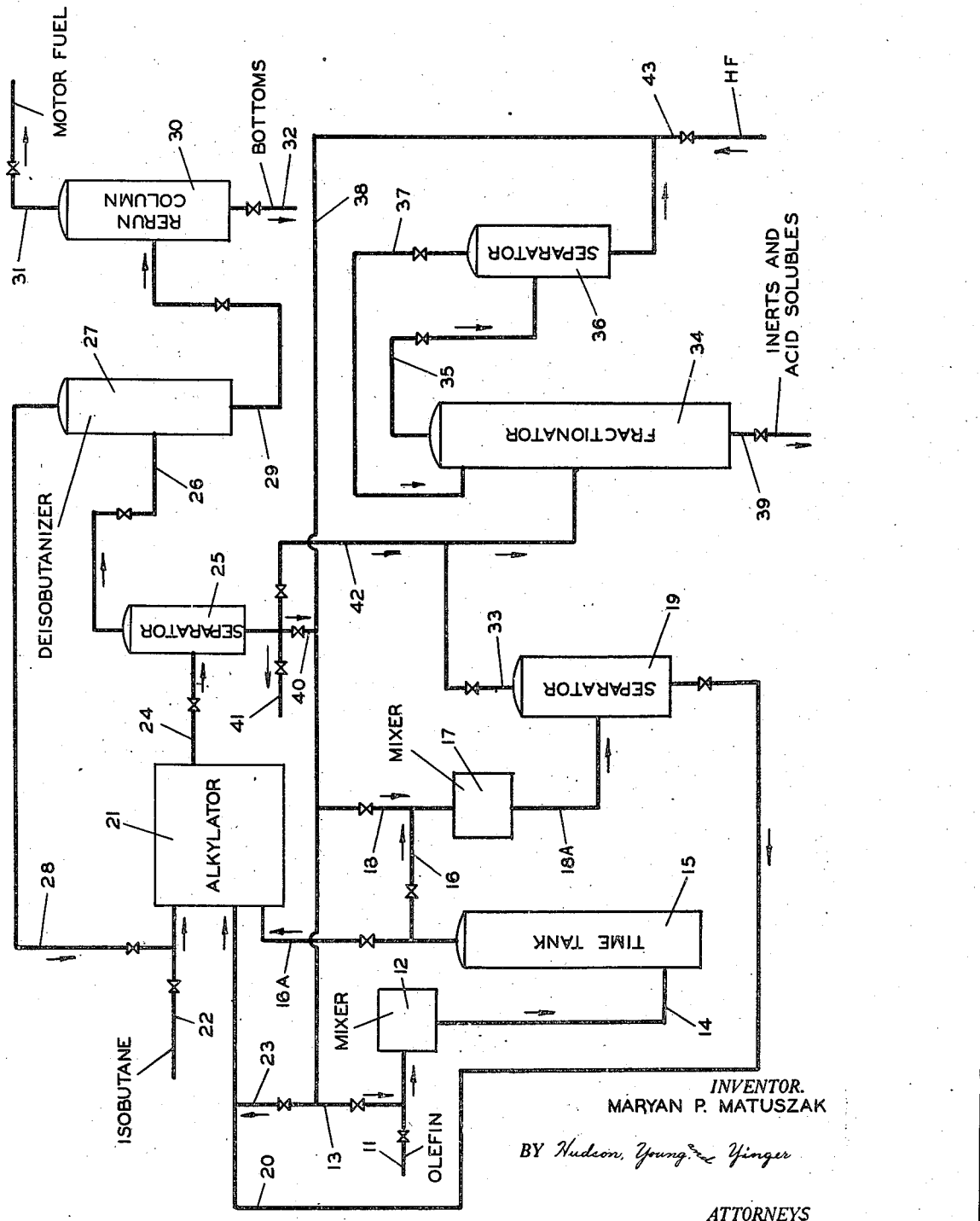

2,387,162

UNITED STATES PATENT OFFICE 2,387,162

CONVERSION OF HYDROCARBONS

Maryan P. Matuszak, Bartlesville, Okla., assignor to Phillips Petroleum Company, a corporation of Delaware Application December 4, 1942, Serial No. 467,874

4 Claims. (Cl. 260—683.4)

This invention relates to a process for the conversion of hydrocarbons in the presence of a liquid acid-type catalyst. This application is a continuation-in-part of my copending application, Serial No. 395,282, filed May 26, 1941, now Patent 2,320,629, issued June 1, 1943.

In present-day acid-catalyzed hydrocarbon alkylation processes, it is necessary, for obtaining optimum results, to limit the proportions of inert diluents in the feeds to the alkylating zones. Diluents in the feeds reduce the maximum production capacities of alkylating equipment and, if present in very high proportions, cause reductions in yield and quality of products. Diluents are sometimes removed from feeds by fractional distillation; however, in many instances, particularly in the utilization of olefinic streams which contain only a few per cent of olefin, fractional distillation to remove diluents is not economically practicable.

In present-day acid-catalyzed alkylation processes for reacting paraffins with olefins to produce heavier paraffins, the principal or major constituents of the alkylates produced under ordinary good reaction conditions are those which would be formed if one olefin molecule added to one paraffin molecule by a mechanism, herein termed paraffin-olefin juncture, whereby apparently a methyl group from the original paraffin becomes attached to one of the two double-bond carbon atoms of the original olefin and the rest of the original paraffin becomes attached to the other double-bond carbon atom of the original olefin. The number of carbon atoms per molecule of the major chemical components of the product is equal to the sum of the numbers of carbon atoms per molecule of the paraffin and the olefin reactants. Further, only a limited number of the many paraffin isomers characterized by this number of carbon atoms per molecule are formed as primary products of simple paraffin-olefin junctures, although other isomers may be formed in small proportions by so-called secondary and side reactions, such as isomerization of the primary product, dimerization of the original olefin accompanied or followed by hydrogenation of the dimer, and the like.

Those skilled in the art of alkylation have hitherto directed their efforts mainly towards increasing the extent of the simple paraffin-olefin juncture and towards decreasing the extent of side reactions, especially polymerization of the olefin. However, in many instances, specific side reactions other than polymerization produce constituents in the alkylate that are more desirable than those produced by the juncture of the initial paraffin with the initial olefin. Further, these specific desirable side reactions may be greatly and selectively promoted in accordance with the concept of the present invention.

An object of this invention is to provide an improved process for conversion of lower boiling hydrocarbons to higher boiling hydrocarbons.

Another object of this invention is to produce paraffins by an "alkylation" process wherein certain desirable side reactions, which ordinarily occur to only a limited extent, are selectively promoted so that they occur to a much larger extent.

Another object of this invention is to remove inert diluents from olefin-containing feeds to alkylation processes and simultaneously to convert the olefins to simple olefin-catalyst addition products or complexes prior to introducing said olefins into an alkylating zone.

Another object of this invention is so to react isobutane and a non-isobutylene olefin having three to five carbon atoms per molecule as to obtain high yields of isoctane.

A specific object of this invention is to convert propylene, in a hydrocarbon stream containing inert diluents, to isopropyl fluoride, to extract the resulting isopropyl fluoride in liquid concentrated hydrofluoric acid, and to utilize the extract as alkylating agent and catalyst in an alkylating zone.

Another object of this invention is to increase the total yield of higher-boiling and normally liquid or gasoline-range paraffins produced from a given weight of an olefinic reactant in acid-catalyzed alkylation of isopentane.

Another object of this invention is to produce high proportions of isobutane and isohexanes during the condensation of isopentane and butylene in the presence of a liquid acid-type alkylation catalyst.

Other objects and advantages of this invention will appear from the following detailed description, taken in conjunction with the accompanying drawing, which is a diagrammatic elevational view of one specific modification of apparatus suitable for use in carrying out the process of the invention.

As catalyst in the process may be used any liquid acid-type catalyst capable of promoting the desired alkylation reaction. Examples of such catalysts are: concentrated hydrofluoric acid, concentrated sulfuric acid, mixtures of sulfuric and hydrofluoric acids, fluorosulfonic acid, chlorosulfonic acid, concentrated hydrofluoric acid containing small proportions of boron trifluoride, boron trifluoride-water complexes, phosphoric acid containing dissolved boron trifluoride, aluminum chloride-hydrocarbon complexes, and the like. The choice of catalyst depends upon economic factors, the nature of the alkylating reactants, and individual characteristics of the catalyst, such as ease of handling, corrosive properties, and the like. Generally, for alkylating aromatics or isoparaffins with olefins having three or more carbon atoms per molecule, concentrated or substantially anhydrous hydrofluoric acid is preferred. In some instances, as when there is a nearby market for impure sulfuric acid, such as spent alkylation acid, it may be advantageous to use sulfuric acid as the catalyst. When ethylene and/or normal paraffins or cyclohexane are used as alkylating reactants, it is desirable to use one of the most active of the alkylation catalysts, such as aluminum chloride or bromide, or, preferably hydrofluoric acid containing a small proportion of boron trifluoride, such as 1 to 10 per cent.

Although ordinary mixing of any of the above-mentioned catalysts with an olefin results in rapid polymerization and hydropolymerization of the olefin to form products which are relatively undesirable as alkylating reactants and which destroy the activity of the catalyst for effecting alkylation, these catalysts may be brought together with olefins in such a manner that reaction is limited to formation of simple olefin-catalyst addition products such as alkyl fluorides or sulfates, simple aluminum chloride-olefin complexes, and the like. Also, processes have been proposed for rapidly absorbing olefins in large quantities of catalysts, such as hydrofluoric acid or sulfuric acid, and passing the resulting absorbate or extract to an alkylating zone; in these processes, the time of contact of olefin with the catalyst prior to introduction into an alkylating zone must be inconveniently short, and even then some of the olefin is usually lost by undesired polymerization and hydropolymerization. By following the principles of the present invention the over-all loss of olefin by undesirable polymerization reactions can be reduced practically to nothing, and the time of contact of olefin (or olefin-catalyst addition product) with the catalyst prior to introduction to an alkylating zone can be increased to a convenient value.

The nature of the chemical reactions which are involved in the absorption of olefins by an acid-type alkylation catalyst may be illustrated by the following simplified chemical equations:

(1) 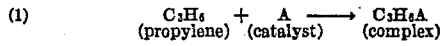

(2) 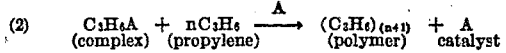

Reaction 1 represents the formation of a simple olefin-catalyst addition product. This reaction occurs under relatively mild conditions and is generally noncatalytic in nature. Reaction 2 occurs readily in the presence of excess of catalysts but does not occur readily in the absence of free catalyst; this reaction involves the combination of an initially formed simple olefin-catalyst complex or addition product molecule with one or more molecules of free or uncombined olefin to form polymer. It is apparent from these equations that conditions favorable to Reaction 2, namely, the presence of olefin catalyst complex, free olefin, and excess catalyst, will exist when an olefin-containing hydrocarbon stream is directly contacted with an excess of catalyst, as in ordinary alkylation or in direct olefin-extraction processes. If, in accordance with this invention, the olefin is contacted with just sufficient catalyst to combine with the olefin, Reaction 1, which is noncatalytic, can occur readily, but Reaction 2, which requires excess catalyst, cannot occur readily. Then, if after the olefin is substantially completely converted to the simple olefin-catalyst complex, as illustrated by Reaction 1, the complex is contacted with excess catalyst, as in the extracting step of this invention, Reaction 2 still cannot occur readily because, although there is excess catalyst, there is relatively little or substantially no free or uncombined olefin. Although Reaction 1 is reversible, the reverse reaction is sufficiently slow that the free olefin concentration and consequently the rate of polymerization by Reaction 2 is very much lower when the principles of this invention are followed than when the olefin is extracted directly with excess catalyst.

One aspect of this invention comprises selectively promoting specific side reactions, other than polymerization of olefins, which normally occur to only a minor extent in acid-catalyzed alkylation of paraffins with olefins.

One particularly noteworthy side reaction selectively promoted in accordance with the present invention results in the over-all effect of a hydrogen-transfer from the reactant paraffin to the olefinic reactant, followed by juncture of the resulting dehydrogenated paraffin or newly formed "olefin" with unreacted paraffin. This reaction produces a by-product paraffin having the same number of carbon atoms per molecule as the olefinic reactant, and a product paraffin having exactly twice as many carbon atoms per molecule as the original paraffin in the feed. This reaction is particularly desirable when isobutane is being reacted with propylene, normal butenes, or amylenes, especially when a plentiful supply of isobutane is available, since the product paraffin is mostly 2,2,4-trimethylpentane (isooctane), which is desirable because of its high octane rating.

Isobutane and propylene ordinarily yield 2,3- and 2,4-dimethylpentanes by simple paraffin-olefin juncture, whereas they yield propane and octanes (mostly isooctane) by the "hydrogen transfer-alkylation" just described. Isooctane has a higher octane rating (A. S. T. M. octane No.=100) than the dimethylpentanes (A. S. T. M. octane No.=82 and 89), and the theoretical yield of isooctane based on the weight of propylene in the feed is 271 per cent, which is considerably more than the theoretical yield of dimethylpentanes of only 238 per cent. The by-product propane may be dehydrogenated in a dehydrogenation step to produce propylene and hydrogen, and the resulting propylene may be returned to the "hydrogen transfer-alkylation" step.

Although the mechanisms of all the reactions are not yet fully known, the following illustrative chemical equations, deduced from data obtained by extensive experimentation, appear to account for some of the principal reactions of isobutane and propylene that can occur in acid-catalyzed alkylation:

*Simple paraffin-olefin juncture*

(1) 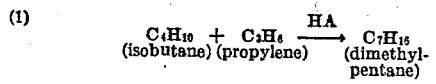

*Hydrogen transfer-alkylation*

(2) 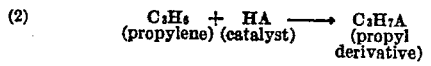

(3) 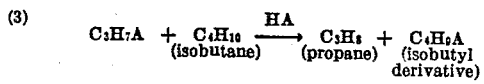

(4) 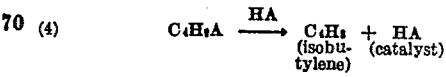

(5) 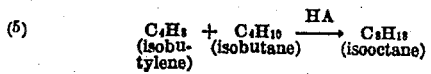

Isobutane and normal butenes yield 2,3,4-trimethylpentane and 2,4-dimethylhexane by simple paraffin-olefin juncture, whereas they yield mostly isooctane by hydrogen transfer-alkylation. Of these products isooctane has the highest octane number and is therefore the most desirable for use in such motor fuels as aviation gasoline. Although the hydrogen transfer-alkylation is more desirable, in reacting isobutane and normal butenes, than simple or primary paraffin-olefin junctures, another over-all reaction, which may be called "olefin isomerization-alkylation" and which normally occurs to only a relatively minor extent, is even more desirable, since it avoids the formation of by-product normal butane. This reaction is selectively encouraged in some ways by conditions similar to those which encourage hydrogen transfer-alkylation; it will be discussed hereinafter.

The acid-catalyzed simple junctures of isobutane with amylenes yield nonanes, which have not yet been positively identified as to particular isomers. The corresponding hydrogen transfer-alkylation yields isooctane as a product and pentanes as a by-product. This reaction occurs to an appreciable but minor extent under ordinary alkylating conditions, but by application of this invention it may be selectively greatly encouraged. The isooctane thus produced as a major product has a higher A. S. T. M. octane number (100) than that of the nonane fraction normally produced (e. g. 91.6). Although the theoretical yield of octanes based on the weight of olefin in the feed by this hydrogen transfer-alkylation is slightly less than the theoretical yield of nonanes by ordinary alkylation, the by-product pentanes are also useful for blending in gasoline and should be included in a consideration of the relative yields. Accordingly, the total theoretical yield of gasoline products (octanes plus pentanes) is 266 weight per cent for the hydrogen transfer-alkylation, or considerably more than that of 183 for the ordinary or simple-juncture alkylation.

Other examples of hydrogen transfer-alkylations are: isobutane and cycloolefins to give octanes and by-product cycloparaffins; isobutane and ethylene to give octanes and ethane; and the line. The reaction of isobutane and cycloolefins, such as cyclohexene, proceeds readily under about the same conditions as the reaction of isobutane and normal butenes. When ethylene is used, it is desirable to use a relatively high reaction temperature such as about 200 to 400° F., or a very active catalyst to obtain reasonably rapid reaction rates. One of the most satisfactory catalysts for use in alkylating with ethylene consists of substantially anhydrous hydrofluoric acid having dissolved in it a minor proportion, such as 1 to 10 per cent by weight, of boron fluoride; the small proportion of boron fluoride has a strong promoting or enhancing effect on the catalytic action of the hydrofluoric acid, whereby ordinary temperatures, such as 100 to 200° F., may be used.

In the alkylation of isobutane with butylenes the over-all reaction already mentioned which may be termed "olefin isomerization-alkylation" tends to minimize differences in products obtained from different butylenes. That is, there is a tendency for any given butylene to isomerize, under alkylating conditions, to an equilibrium mixture of the various butylenes. If an equilibrium mixture (thermochemical equilibrium) were actually obtained before any of the butylenes entered into the alkylation reaction, identical products would be obtained from each of the different butylenes. Actually, although some isomerization of butylenes occurs prior to consumption of the butylenes by alkylation in ordinary acid-alkylation systems, the isomerization does not approach equilibrium. The products from alkylation of isobutane with various butylenes, therefore, are qualitatively similar, but differ in the relative proportions of the various constituents. For example, the alkylate from butene-1 contains relatively the least isooctane and the most 2,4-dimethylhexane; the alkylate from isobutylene contains the most isooctane and the least 2,4-dimethylhexane, and the alkylate from butene-2 contains intermediate proportions of isooctane and 2,4-dimethylhexane and a major proportion of 2,3,4-trimethylpentane, which is the simple or primary juncture product of isobutane and butene-2. Isooctane is the principal primary juncture product of isobutane and isobutylene; 2,3,3-trimethylpentane is another desirable primary juncture product (A. S. T. M. octane rating=100) of isobutane and isobutylene, but only small proportions are formed. The principal primary juncture product of isobutane and butene-1 is 2,4-dimethylhexane; another primary juncture product of isobutane and butene-1, which is formed only in very small proportions, however, is 2-methyl-3-ethylpentane. By the application of the present invention, the isomerization of normal butylenes prior to juncture with isobutane can be encouraged to the extent that they give products which are similar to that hitherto normally obtained only from isobutylene.

Another desirable side reaction, which may be selectively encouraged in accordance with the principles of this invention, occurs normally only to a minor extent in the alkylation of isopentane with olefins. This side reaction results in an apparent disproportionation of isopentane to isobutane and isohexanes (2- and 3-methylpentanes). For example, under some conditions, which are especially effective in the alkylation of isopentane with olefins in the presence of anhydrous hydrofluoric acid, a surprisingly large proportion of the isopentane is converted to isobutane and isohexanes, concurrently with primary alkylation of another part of it, so that yields of hexanes and higher-boiling gasoline hydrocarbons as high as 500 or more per cent by weight of the olefin in the feed are obtained. This "disproportionation-alkylation" may be advantageously carried out in a combination alkylation-fractionation equipment wherefrom isobutane is distilled overhead, in company with some hydrofluoric acid, while the reactions are progressing. The isobutane produced by the disproportionation may be used as feed stock for other processes, as for a process in which it itself is alkylated; in the interest of an increased yield of higher-boiling or gasoline hydrocarbons from the disproportionation-alkylation, the isobutane is preferably removed from the reaction mixture as soon as possible after formation, and it is preferably not recycled with unreacted isopentane to this particular process.

In addition to being based in part on the observation that in many alkylations using a liquid acid-type catalyst, especially hydrofluoric acid, certain side reactions lead to products which in specific instances are more desirable than the primary or simple paraffin-olefin juncture products, the present invention in some of its features involves the following general principles.

1. Different reactions have different temperature coefficients of reaction rates, so that certain reactions may be selectively encouraged by selecting and controlling the temperature and the reaction time.

2. Over-all or mass reaction rates are dependent upon concentrations of reactants, so that certain reactions may be selectively encouraged by suitably controlling concentrations of reactants.

With respect to the first of these principles, in the concept of this invention, an increase in reaction temperature favors hydrogen transfer-alkylation and disproportionation-alkylation, and disfavors olefin isomerization-alkylation, relative to simple or primary alkylation. That is, increasing the temperature increases the reaction rates of hydrogen transfer and of disproportionation relatively more than the reaction rate of primary alkylation, and it increases the reaction rate of olefin isomerization relatively less than the reaction rate of primary alkylation. The practical temperature range is, of course, limited by excessive cracking reactions or decompositions at the upper limit and by disadvantageously low reaction rates at the lower limit. Within the practical temperature range, the optimum temperature for favoring the desired side reaction may be readily determined by trial for any particular case. For promoting hydrogen transfer-alkylation and disproportionation-alkylation, a temperature in the upper part of the practical range is to be preferred; for promoting olefin isomerization-alkylation, a temperature in the lower part of the practical range is to be preferred. The practical temperature range varies somewhat with specific catalysts and reactants, but for the sake of concreteness it may be said to be roughly from about $-20°$ F. to about $300°$ F. for such a catalyst as hydrogen fluoride and for olefins other than ethylene. The reaction temperature is interrelated with the reaction time, for the reaction time required to effect a given extent of reaction is generally shorter at a high temperature than at a low temperature.

With respect to the second of these principles, in general, the desired side reactions are preferentially favored if the concentration of free olefin is minimized by reaction with the catalyst before the olefin can react with the paraffin by primary alkylation or with additional olefin by polymerization. Although olefins readily add to hydrogen fluoride, or undergo hydrofluorination, to form alkyl fluorides, the part played by this reaction in primary paraffin-olefin and olefin-olefin junctures in the presence of concentrated hydrofluoric acid as a catalyst is that of a reversible side reaction, not that of an intermediate reaction; that is, these primary juncture reactions comprise the addition of an activated paraffin or olefin molecule directly to a simple olefin molecule, and alkyl fluorides or similar olefin derivatives undergo these reactions only after being converted to simple olefins. Hence, the rates of primary paraffin-olefin and olefin-olefin junctures are decreased by lowering the concentration of free or uncombined olefin in the reaction zone. Conversely, the rates of the competitive side reactions, in which the olefin appears to take part relatively more effectively in the form of a compound or complex with the catalyst, as illustrated by Equations 2 to 5, are simultaneously increased. Specific examples of such side reactions are those involving hydrogen transfers, olefin isomerizations, and the like.

Although one excellent method of obtaining maximum concentrations of combined olefin with minimum concentrations of free olefin evidently involves the direct use of alkyl compounds, such as alkyl fluorides, alcohols, and the like, instead of olefins, as alkylation agents, in practice this method makes necessary the use of a separate process for manufacturing such alkyl compounds from olefins. A simple combination process for converting olefins to alkyl fluorides followed by an alkylating step is therefore desired for commercial applications. In accordance with one aspect of the present invention, results approaching the ideal are obtained by adding a limited proportion of a liquid acid-type alkylation catalyst to an olefin-containing hydrocarbon stream, the total added catalyst being roughly equivalent stoichiometrically to the total olefin, and giving the olefin and catalyst an opportunity to become combined, prior to introducing the stream into an alkylating zone, in which an excess of the same catalyst and an excess of an alkylatable hydrocarbon are present. One modification, which is especially suitable for use when the olefin-containing stream contains an excessive proportion of inert or diluent hydrocarbons, comprises adding a limited proportion of a liquid acid-type alkylation catalyst to an olefin-containing hydrocarbon stream, the total added catalyst being roughly equivalent stoichiometrically to the total olefin, giving the olefin and catalyst an opportunity to become combined, extracting the resulting olefin-catalyst addition product with excess of the same catalyst, and passing the resulting extract to an alkylating zone in which an alkylatable hydrocarbon is present. Such a procedure differs from previous practice, in which it has been thought desirable to avoid contacting the olefin with the alkylating catalyst prior to introduction into the alkylating zone, in order to minimize undesired olefin consumption by polymerization and hydropolymerization, which occur extensively when a separate catalyst phase is present. In accordance with the concept of this invention, however, in order to selectively promote desirable side reactions such as have been described hereinbefore, it is advantageous to contact the olefin, diluted by paraffin hydrocarbons, with roughly an equivalent proportion of catalyst prior to introduction into the alkylating zone, since thereby the formation of olefin-catalyst addition products may be brought about without appreciable consumption of olefin by polymerization, conjunct polymerization, and the like. Further, when the olefin is diluted by excessive proportions of inert hydrocarbons, it is advantageous to extract olefin-catalyst addition product in excess catalyst prior to introducing it into the alkylating zone since thereby the concentration of inert materials in the alkylating zone is decreased. Once formed, these addition products apparently do not react with alkylatable paraffins until they are reconverted to olefins, either the same as the original olefins or different from them, thereby causing a delay in the effecting of paraffin-olefin junctures and consequently presenting opportunities for hydrogen transfers, olefin isomerizations, and disproportionations to occur.

As the catalyst, liquid substantially anhydrous hydrofluoric acid is preferred because it is advantageously appreciably soluble in paraffin hydrocarbons and withal it is readily removable and/or recoverable from them. The solubility of hydrofluoric acid in paraffins is illustrated by the solubility of hydrofluoric acid in isobutane, which has been experimentally determined to increase with temperature substantially linearly from 0.3 to 0.9 per cent by weight in the temperature range of 32 to 140° F. A concentration of uniformly dispersed hydrofluoric acid of between about 0.6 and 4 per cent by weight is preferred. However, the invention is generally applicable with minor modifications to other liquid acid-type condensation catalysts, such as sulfuric acid, mixtures of sulfuric acid and hydrofluoric acid, chlorosulfonic acid, fluorosulfonic acid, phosphoric acid, phosphoric acid-boron fluoride mixtures, aluminum chloride suspended or dissolved in various solvents, hydrofluoric acid containing small proportions of dissolved substances such as boron fluoride, and the like. Hydrofluoric acid is usually preferred in many alkylations because it results in a more clean-cut reaction and the ranges of operating conditions used with it are generally broader and more readily controllable than with other catalysts. When ethylene and/or normal paraffins are reactants, however, it is desirable to add a small proportion, such as 1 to 10 per cent by weight, of boron fluoride to the catalyst to increase the activity of the catalyst.

Understanding of some aspects of the invention may be aided by reference to the accompanying drawing, which is a schematic flow-diagram of one arrangement of apparatus suitable for practicing the invention. For the sake of concrete illustration, the description in connection with this flow-diagram will be limited to isobutane and propylene as the alkylation reactants and to concentrated hydrofluoric acid as the catalyst. The invention is applicable to many different alkylation reactants and catalysts, and, taking into account specific characteristics of various reactants and catalysts, those skilled in the art of hydrocarbon conversion will be able to modify the flow scheme discussed herein to suit other specific instances.

A liquefied olefin-containing hydrocarbon stream, such as one containing about 1 to 50 per cent propylene, the remainder being relatively inert hydrocarbons such as propane, ethane, and normal butane, is admitted through inlet 11 to mixer 12. A proportion of concentrated liquid hydrofluoric acid roughly molecularly equivalent to the total unsaturates (propylene) is admitted through conduit 13. Very rapid dispersion of the hydrofluoric acid throughout the olefin-containing stream should be effected in order to avoid high local concentrations of uncombined hydrofluoric acid and to minimize the tendency for olefin to polymerize or hydropolymerize. The mol proportion of hydrofluoric acid used should be in the range of about 0.5 to 3 times the total olefin. Usually a proportion between about 1 and 1.5 is preferable. At proportions less than 1 there is insufficient hydrofluoric acid to combine with all the olefin, whereas at proportions greater than about 1.5, polymerization may become considerable or even excessive. The hydrofluoric acid should be introduced at a point of high turbulence either in the inlet conduit to mixer 12 or directly in the mixer. Mixer 12 may be any suitable means, such as a small baffled chamber, an orifice- or jet-type mixer, a centrifugal pump, or the like, for insuring rapid dispersion of the hydrofluoric acid throughout the hydrocarbon stream.

From mixer 12 the mixture passes through conduit 14 to time tank 15, wherein conditions are adjusted to favor addition of hydrofluoric acid to propylene without promoting polymerization or hydropolymerization of propylene. The conditions may comprise; a temperature in the range of about 40 to 200° F.; a contact or reaction time, inversely dependent on the temperature, in the range of a minute or less to an hour or more; and a pressure sufficient to maintain the mixture predominantly in the liquid phase. There should be sufficient agitation in time tank 15 to prevent formation of a separate liquid hydrofluoric acid layer in the bottom. Normally a temperature of about 80 to 130° F. is preferred, because the temperature is readily maintained within this range without the use of refrigerating or heating equipment. The corresponding time and pressure ranges are about 2 to 30 minutes, and about 100 to 300 pounds per square inch, respectively.

The resulting isopropyl fluoride-containing mixture passes from time tank 15 through conduit 16 to mixer 17 wherein it is intimately contacted with liquid concentrated or substantially anhydrous hydrofluoric acid admitted to mixer 17 through conduit 18. When the proportion of inert diluents is low, it is desirable to pass part, and sometimes all, of the mixture from time tank 15 through conduit 16A directly to alkylator 21. This is usually economical when the concentration of alkyl fluorides is above about 20 mol per cent. The conditions in mixer 17 are selected to permit extraction of alkyl fluorides (isopropyl fluoride) by the liquid hydrofluoric acid. The volume of hydrofluoric acid used should be sufficient to form a separate acid phase and preferably should be equivalent in mols to about 5 to 20 or more times the number of mols of alkyl fluorides extracted. Lesser proportions are likely to result in incomplete extraction of alkyl fluorides, whereas greater proportions place an unnecessarily large quantity of hydrofluoric acid in circulation in the system. The time of contacting may be in the range of about 30 seconds to five minutes—the shorter the better as long as intimate contacting of acid and hydrocarbon is attained. When the time is excessively long, decomposition and degradation of the alkyl fluorides occur. The temperature should be as low as is economically feasible within the range —20 to 130° F., preferably at least below 100° F., in order to minimize the solubility of hydrofluoric acid in the hydrocarbon phase. From mixer 17 the mixture passes through conduit 18A to separator 19, wherein it is separated by cooling and/or gravitational or centrifugal means into two liquid phases. The time of residence of the hydrofluoric acid phase in separator 19 should be as short as conveniently possible, preferably less than about 10 minutes, in order to minimize degradation reactions of the isopropyl fluoride. The allowable time is inversely dependent upon the temperature and inversely dependent upon the concentration of isopropyl fluoride in the hydrofluoric acid. Generally the temperature should be as low as possible within the range of about —20 to 130° F., usually at least below 100° F., depending upon the degree of cooling which is economically feasible.

The heavier or hydrofluoric acid phase, which contains dissolved isopropyl fluoride, is passed through conduit 20 to alkylator 21 for use as catalyst and alkylating agent. Isobutane, which may be taken as a typical alkylatable hydrocarbon, is admitted to alkylator 21 through inlet 22. Additional hydrofluoric acid may be introduced through 23, though generally the hydrofluoric acid in the mixture from separator 19 is sufficient. The reaction conditions in alkylator 21, which are well-known to those skilled in the art of hydrofluoric acid alklation, may comprise a temperature in the range −20 to 200° F., sufficient pressure to maintain liquid phase, an average reaction time in the range of about 1 to 100 minutes, good agitation, an isobutane-to-alkyl fluoride mol ratio in the range of about 1.5 to 10 or more, and a hydrocarbon-to-catalyst volume ratio in the range of about 0.2 to 4. Near optimum conditions, all things considered, are about as follows: temperature, 100° F.; pressure, 100 pounds per square inch; time 20 minutes; isobutane-to-alkyl fluoride mol ratio, 5; hydrocarbon-to-catalyst volume ratio, about 1.

From alkylator 21, the reaction mixture is passed through conduit 24 to separator 25, wherein, by cooling and/or gravitational or centrifugal means, it is separated into two liquid phases. The lighter or hydrocarbon phase from separator 25, is passed through conduit 26 to deisobutanizer 27, wherefrom a fraction comprising a major proportion of isobutane and a minor proportion of hydrogen fluoride is distilled overhead and is recycled via conduit 28 to alkylator 21, and a bottom or kettle fraction, comprising normally liquid paraffin hydrocarbons, is passed through conduit 29 to rerun column 30.

Rerun column 30, by fractional distillation, separates the hydrocarbons from the bottom of deisobutanizer 27 into a major fraction of saturated gasoline-range hydrocarbons, principally isooctane and dimethylpentane, which may be withdrawn through outlet 31, and into a minor fraction of hydrocarbons boiling above the desired gasoline range, which may be withdrawn through outlet 32.

The lighter or hydrocarbon layer from separator 19 is passed through conduit 33 to fractionator 34. From fractionator 34 a mixture of hydrogen fluoride, unextracted alkyl fluorides, and hydrocarbons is distilled overhead and is passed through conduit 35 to separator 36. In separator 36, the mixture is separated by cooling and/or gravitational or centrifugal means into two liquid phases, of which the lighter or hydrocarbon phase is returned through conduit 37 as reflux to fractionator 34, and of which the heavier or hydrofluoric acid phase is recycled to preceding steps in the process through conduit 38. The bottom or kettle fraction from fractionator 34 comprises the inert or diluent material originally introduced into the process with the olefin and small proportions of tarry acid-soluble oils; this fraction may be withdrawn through outlet 39.

Although most of the heavier or hydrofluoric acid phase from separator 25 is recycled through conduit 40 to alkylator 21, mixer 12, and mixer 17, part of it may be passed through conduit 41 to means, not shown, for purification. Preferably, however, to economize on equipment, this part may be passed through conduit 42 to fractionator 34, wherein it mixes with olefin-depleted hydrocarbon containing dissolved hydrofluoric acid from separator 19. Acid-soluble materials and hydrocarbons are withdrawn through outlet 39, and the hydrofluoric acid, relatively free from undesired dissolved materials, is passed overhead, is separated in separator 36, and is recycled to the various steps requiring fresh hydrofluoric acid. Make-up hydrofluoric acid may be introduced through inlet 43.

Numerous modifications of the foregoing flow scheme, suitable for specific applications, will be apparent to those skilled in the art of hydrocarbon conversion. For example, used hydrofluoric acid may be purified in a separate distilling step not shown in the drawing; additional fractionators may be employed for purifying recycled isobutane or for separating out particular narrow-boiling fractions such as isooctane from the alkylate; and in some instances it will be desirable to include a step for removing organically combined fluorine from the products. The removal of organic fluorine is readily accomplished by contacting the products with a dehydrogenation-type catalytic material, such as metal-impregnated contact masses or, more economically, bauxite, at a temperature in the range of about 100 to 500° F. Conventional equipment such as pumps, valves, conduits, coolers, heaters, fractionators, and the like, are to be used wherever they appear necessary or convenient.

To illustrate further some of the many aspects of this invention, the following specific examples are given.

*Example I*

To a refinery gas fraction comprising about 10 mol per cent propylene and 90 mol per cent propane is added in a centrifugal-type mixer a proportion of concentrated hydrofluoric acid molecularly equivalent to the propylene. The mixture passes to a reaction vessel maintained at a temperature below about 80 to 90° F. by cold water coils. The residence time in this vessel is about 10 to 20 minutes. The vessel is provided with a stirrer to prevent the separation of a hydrofluoric acid layer in the bottom. From this vessel the mixture passes to another centrifugal-type mixer into which is introduced an additional quantity of concentrated hydrofluoric acid approximately equal in volume to the total original propylene-containing stream. The resulting mixture passes to a centrifugal separator, from which the heavier or hydrofluoric acid phase is withdrawn and passed immediately to an alkylating zone. Into the alkylating zone is introduced isobutane in a mol proportion about 5 times that of the original propylene. The alkylation temperature is about 100° F.; the pressure, 150 pounds per square inch; and the reaction time, 10 minutes. The effluent mixture from the alkylating zone is separated into an acid layer which is recycled to the two mixers mentioned hereinbefore, and a hydrocarbon phase which is further separated by fractional distillation into an isobutane fraction, a motor-fuel fraction, and a minor high-boiling kettle fraction. The motor-fuel fraction is characterized approximately as follows:

| | |
|---|---:|
| Yield, wt. per cent of propylene | 225 |
| Octane No. (A. S. T. M.) | 93 |
| Composition, volume per cent: | |
|     Hexanes | 3.7 |
|     Heptanes | 36.6 |
|     Octanes (mostly isooctane) | 55.2 |
|     Nonanes and heavier | 4.5 |
| Total | 100.0 |

It is noteworthy that the major constituent of the alkylate is isooctane. It is noteworthy also that the octane number of the alkylate is 93, which is considerably higher than the octane numbers of about 88 to 90 usually obtained in conventional processes for alkylating isobutane with propylene.

*Example II*

Normal butane is catalytically dehydrogenated to the extent of about 20 to 30 per cent, as by a catalyst comprising chromium oxide under suitable dehydrogenation conditions, in a manner well known to the art. To the resulting effluent is added hydrofluoric acid in a proportion approximately 1.2 times that molecularly equivalent to the butylene content. After a reaction period of about 10 to 15 minutes, an excess of about 10 times as much additional liquid hydrofluoric acid is intimately mixed with the reaction mixture, and the resulting two-liquid-phase mixture is allowed to settle into two layers. The lower layer is passed to an alkylation zone wherein it is intimately agitated with an approximately equal volume of liquid isopentane at about 100° F. for about 10 to 15 minutes. The resulting mixture is then separated into two liquid layers, and the lower layer is recycled and/or purified. The upper layer is freed from acid and is then fractionally distilled to isolate the gasoline-range product boiling above pentane. This product amounts to about 400 to 450 per cent by weight of the butylene, and it comprises about 40 to 45 per cent isohexanes; its octane number is about 80. In addition to this gasoline-range product, there is formed isobutane in a proportion approximately molecularly equivalent to the isohexanes; this formation of isobutane is particularly desirable because the isobutane is advantageously utilizable for the production of isooctane by alkylation with olefins.

This invention may be applied to many different alkylations, including the alkylation of any alkylatable hydrocarbon with an olefin or a diolefin having 2 to 12, preferably 3 to 5, carbon atoms per molecule in the presence of a suitable liquid acid-type alkylation catalyst. Alkylatable hydrocarbons, as now known, include aromatics, isoparaffins, normal paraffins, and cycloparaffins. In all such alkylations this invention provides a simple, economical method for efficiently concentrating, and utilizing as alkylating agents, olefins which are accompanied by undesirable proportions of inert or diluent hydrocarbons.

This invention is of great value in instances in which it is desired to promote certain desirable reactions, such as hydrogen transfer-alkylation, olefin isomerization-alkylation, and disproportionation-alkylation, preferentially to simple or primary paraffin-olefin junctures.

Because this invention may be practiced otherwise than as specifically described or illustrated, and because many modifications and variations within the spirit and scope of it will be obvious to those skilled in the art of alkylation, the invention should not be unduly restricted by the foregoing specification and illustrative example, or by statements of a theoretical nature contained therein, but it should be restricted only in accordance with the appended claims.

I claim:

1. A process for reacting propylene and isobutane to produce propane and octanes as major products, which comprises intimately admixing a liquid hydrocarbon material comprising propylene with liquid hydrofluoric acid in an amount substantially equimolar to the propylene at a temperature between about 40 and 200° F. for a period between about 10 to 20 minutes, intimately admixing with the resulting material an excess of liquid hydrofluoric acid at an extraction temperature not greater than about 100° F. and subsequently separating from residual hydrocarbons a resulting liquid hydrofluoric acid phase, admixing isobutane with said liquid hydrofluoric acid phase at a reaction temperature not less than about 100° F. for a reaction period such that propane and octanes are produced, and separating from effluents of said reaction a hydrocarbon fraction comprising octanes so produced.

2. A process for reacting a low-boiling normal olefin and a low-boiling isoparaffin to produce a low-boiling normal paraffin corresponding to said normal olefin and higher-boiling isoparaffins as major products, which comprises intimately admixing a liquid hydrocarbon material comprising a low-boiling normal olefin with liquid hydrofluoric acid in an amount substantially equimolar to the olefin content of said hydrocarbon material at a temperature between about 40 and 200° F. for a period not greater than about 20 minutes, intimately admixing with the resulting material an excess of liquid hydrofluoric acid at an extraction temperature not greater than about 100° F. and subsequently separating from residual hydrocarbons a resulting liquid hydrofluoric acid phase, admixing a low-boiling isoparaffin with said liquid hydrofluoric acid phase at a reaction temperature not less than about 100° F. for a reaction period such that low-boiling normal paraffins corresponding to said normal olefins and isoparaffins higher-boiling than said isoparaffin reactants are produced, and separating from effluents of said reaction a hydrocarbon fraction comprising higher-boiling isoparaffins so produced.

3. An improved process for reacting a low-boiling olefin and a low-boiling isoparaffin to produce higher-boiling paraffins in the presence of a hydrofluoride acid catalyst, which comprises intimately admixing a hydrocarbon material containing a low-boiling olefin with liquid hydrofluoric acid in an amount substantially equimolar to said olefin, maintaining said admixture for not more than about 30 minutes, intimately admixing with the resulting material a substantial excess of liquid concentrated hydrofluoric acid in an extraction step at an extraction temperature not greater than about 100° F. and subsequently separating a first hydrocarbon phase and a first liquid hydrofluoric acid phase, intimately admixing a low-boiling isoparaffin with said liquid hydrofluoric acid phase under reaction conditions such as to produce higher-boiling paraffin hydrocarbons, separating effluents of said reaction into a second hydrocarbon phase and a second liquid hydrofluoric acid phase, recovering a hydrocarbon product from said second hydrocarbon phase, passing a major portion of said second acid phase to said extraction step as a part of said extraction liquid, passing said first hydrocarbon phase to a distillation step for recovery of dissolved hydrogen fluoride therefrom, passing a minor portion of said second acid phase to said distillation step for removal of organic impurities, and recovering from said distillation step purified hydrogen fluoride and passing same to said extraction step.

4. An improved process for reacting propylene and isobutane to produce higher-boiling paraffins including octanes in the presence of a hydrofluoric acid catalyst, which comprises intimately admixing a hydrocarbon material containing propylene with liquid hydrofluoric acid in an amount substantially equimolar to said propylene, maintaining said admixture for not more than about 30 minutes, intimately admixing with the resulting material a substantial excess of liquid concentrated hydrofluoric acid in an extraction step at an extraction temperature not greater than about 100° F. and subsequently separating a first hydrocarbon phase and a first liquid hydrofluoric acid phase, intimately admixing isobutane with said liquid hydrofluoric acid phase under reaction conditions such as to produce higher-boiling paraffin hydrocarbons including octanes, separating effluents of said reaction into a second hydrocarbon phase and a second liquid hydrofluoric acid phase, recovering a hydrocarbon product comprising octanes from said second hydrocarbon phase, passing a major portion of said second acid phase to said extraction step as a part of said extraction liquid, passing said first hydrocarbon phase to a distillation step for recovery of dissolved hydrogen fluoride therefrom, passing a minor portion of said second acid phase to said distillation step for removal of organic impurities, and recovering from said distillation step purified hydrogen fluoride and passing same to said extraction step.

MARYAN P. MATUSZAK.